United States Patent [19]

Panasuk

[11] Patent Number: 5,205,006
[45] Date of Patent: Apr. 27, 1993

[54] ELECTRICIAN TOOL

[76] Inventor: Alfred J. Panasuk, 7 Bryant Crescent, White Plains, N.Y. 10605

[21] Appl. No.: 581,804

[22] Filed: Sep. 13, 1990

[51] Int. Cl.$^5$ .................................................. B25F 1/00
[52] U.S. Cl. .......................................... 7/108; 7/132; 7/165; 30/90.6
[58] Field of Search ............... 7/107, 108, 165, 132, 7/125, 134, 133, 135; 30/90.1, 90.6; 81/9.4, 9.44

[56] References Cited

U.S. PATENT DOCUMENTS

| | | | |
|---|---|---|---|
| 218,329 | 8/1879 | Stivers | 7/135 |
| 285,708 | 9/1883 | Torrey | 7/135 |
| 639,792 | 12/1899 | Sullivan | 7/108 |
| 1,939,574 | 12/1933 | Saylor | 7/107 |
| 2,206,257 | 7/1940 | Kah | 7/133 |
| 2,306,403 | 12/1942 | Mortensen | 30/90.1 |
| 2,729,996 | 1/1956 | Schoenwald | 7/108 |
| 3,253,286 | 5/1966 | Bacon | 7/108 |
| 3,588,932 | 6/1971 | Sedlacek | 7/107 |
| 3,608,401 | 9/1971 | Freed | 7/108 |
| 4,081,871 | 4/1978 | Knuth | 7/107 |

Primary Examiner—Roscoe V. Parker
Attorney, Agent, or Firm—Martin J. Spellman, Jr.

[57] ABSTRACT

A tool for use by Electricians, as well as by wireman in general, which includes a handle body, a moveable handle portion which is pivotally mounted within a recess of the handle body, and attached to an arm extending forwardly of the pivot and carrying a cutting blade extending towards and opposed to a blade on a screwdriver shaft or base. Each of the wire cutting blades has one or more opposed recesses dimensioned to serve together as wire stripers. A screwdriver shaft having a base end is secured to the front end of the handle body. Extending forwardly of the screwdriver shaft base and spaced slightly laterally therefrom is a dowel shaft for bending wire into eyelets in cooperation with the screwdriver shaft. Replaceably secured to the base of the screwdriver is a cable cutting blade with its cutting edge extending rearwardly from the base of the screwdriver shaft towards the front of the handle body but spaced therefrom.

11 Claims, 5 Drawing Sheets

ELECTRICIAN TOOL

BACKGROUND OF THE INVENTION

1. Field of the Invention

This invention relates to tools used particularly by electricians, as well as wiremen in general, in installing electrical cable which requires that the cable be cut, the sheathing of the cable be slit and stripped away from the insulated wire ensheathed within the cable, and then stripping insulation from the ends of the wires, bending the ends of the wires to form eyelets, and securing the wires to a terminal which requires unscrewing and securing a screw to a fixture, and/or twisting wires together. Generally such operations in the past have required separate screwdrivers, wire cutters and strippers, pliers and/or knives and combination thereof, as well as a relatively high degree of dexterity.

The present invention provides a single hand tool which may be used to accomplish all of the foregoing functions without the necessity of using any other tool, rapidly with ease and greater accuracy, convenience and consistency. Since one tool can be used to perform the whole job, no time is wasted picking up and putting down individual tools and looking for misplaced tools.

2. Prior Art

There is no simple prior art tool that Applicant is aware of that can be utilized to perform all of the functions for which the present tool may be utilized.

Prior art tools which are multi-functional are complex in structure, difficult to use and are less safe than the tool of the present invention.

U.S. Pat. No. 3,253,286 Bacon, discloses a combination wire cutting and stripping tool which also incorporates a wire sheath cutter, stripper, wire bender and screwdriver. In this case, the structure is rather complex and requires more moving parts and does not provide an adequate wire cutter function.

The stripping tool shown in U.S. Pat. No. 4,081,871 Knuth, utilizes a flat blade for stripping sheathing longitudinally and again is very complex structurally, complex to use and does not provide any screw driving function, or twisting or bending function.

Of background interest only are U.S. Pat. No. 2,306,403 Mortensen; U.S. Pat. No. 2,729,996 Schoenwald; U.S. Pat. No. 639,792 Sullivan; and U.S. Pat. No. 3,608,401 Freed which disclose electrician's combination hand tools which perform substantially a lesser number of functions than the tool of the present invention.

SUMMARY OF THE INVENTION

The present invention provides an inexpensive, convenient to use hand tool for electricians and other wiremen which serves a multitude of functions and yet is compact, handy to use and simple in structure.

The tool of the present invention may be used to cut wire cable, strip the sheathing from wire cable, cut the inner wires, strip insulation from the inner wires, form eyelets at the end of the wires, twist wires together, turn screws both conventional and Phillips head to secure wires to fixtures, plugs, switches, etc., and to secure fixtures to mounting surfaces, hangers, and the like. The tool thus may be used to perform all of the routine functions on electrical wires that an electrician or other user encounters in installing wire in fixtures, outlets, switches, and joining wires together.

The tool includes a handle body, a moveable handle portion which is pivotally mounted within a recess of the handle body, and attached to an arm extending forwardly of the pivot and carrying a cutting blade extending towards and opposed to a blade on a screwdriver shaft or base. Each of the wire cutting blades has one or more opposed recesses dimensioned to serve together as wire strippers. A screwdriver shaft having a base end is secured to the front end of the handle body. Extending forwardly of the screwdriver shaft base and spaced slightly laterally therefrom is a dowel shaft for bending wire into eyelets in cooperation with the screwdriver shaft. Replaceably secured to the base of the screwdriver is a cable cutting blade with its cutting edge extending rearwardly from the base of the screwdriver shaft towards the front of the handle body but spaced therefrom.

The pivotal arm pivots on a pivot at the front end of said handle body on a pivot pin which is oriented perpendicularly to the longitudinal axis of said handle body and transverses the forward end of the recess in said handle body. The end of said arm remote from the blade is secured to said moveable handle and is biased to the blade open position, preferably by means of a compression spring acting against the lower surface of the arm and secured to the handle body.

The rear end of said handle body preferably has a longitudinal recess formed therein which serves as a wire twister to eliminate the necessity of the user twisting wires with a pliers or other separate tool.

In a preferred embodiment, the screwdriver shaft is constructed with socket means at the outer end thereof to permit use of interchangeable Phillips head or conventional head screwdriver blades. In such embodiments, the rear of the handle body may also have a closable recess formed therein for storing screwdriver tips and cutting blades that are not being used.

The combination tool of the present invention is easy to use.

NM-B cable or other multi-conductor cable may be initially cut to proper length with the tool, the cable placed between the forward end of the handle and cutting blade at the base of the screwdriver shaft transversely thereof and drawn along the edge of the blade to slit the cable sheath. The slit sheath is then cut away with the opposed scissor blades on the shaft base and moveable arm. These blades are then used to strip the insulation from the ends of the individual wires of the cable.

Using the dowel and screwdriver shaft, the ends of the stripped wires are readily formed into eyelets and the screwdriver portion used to loosen and tighten screws for fastening the wires to fixtures. In the preferred embodiment, a wire twister may be used to secure the ends of wires together by inserting the wire ends in a recess at the rear of the handle body and twisting the wires, securing them together.

The tool eliminates the need for multiple individual tools and places the elements necessary to perform all the essential functions at one end of the handle body. This greatly facilitates performing the functions since the user need not change the orientation of the tool in his hand in addition to being able to use the single tool to perform the functions. In addition only one moving element is required.

While the tool is relatively simple in structure, it performs multiple functions in a very convenient manner.

BRIEF DESCRIPTION OF THE DRAWING

In the accompanying drawing which forms a part of the specification and illustrates, a specific embodiment of the invention.

ILLUSTRATIVE EMBODIMENT

Figure 1:
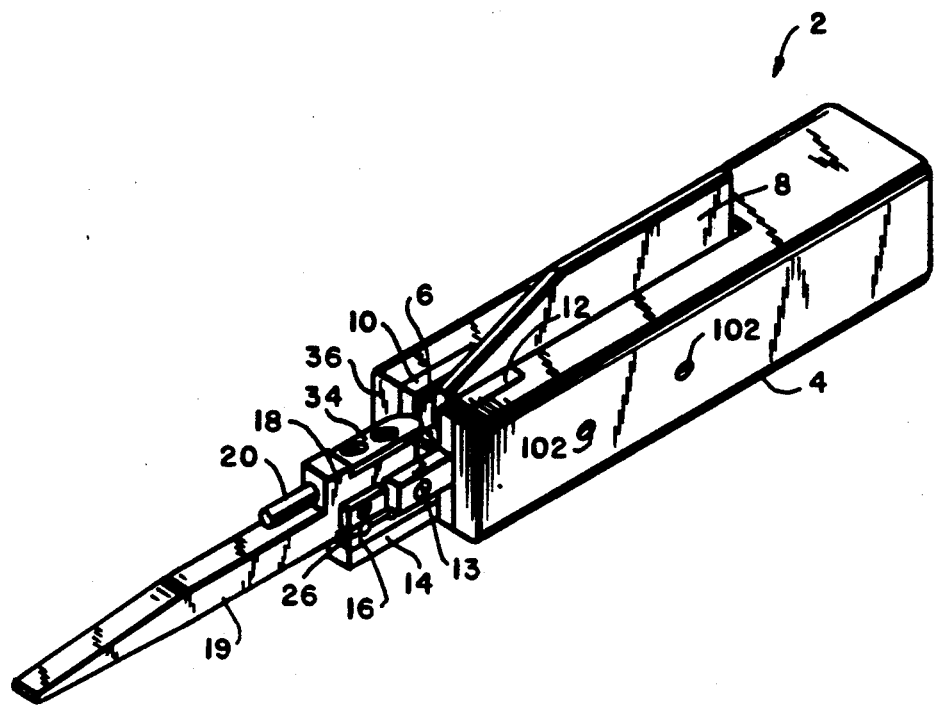
FIG. 1 is a perspective view of the tool of the present invention showing the top, front, and one side of the tool.
Figure 2:
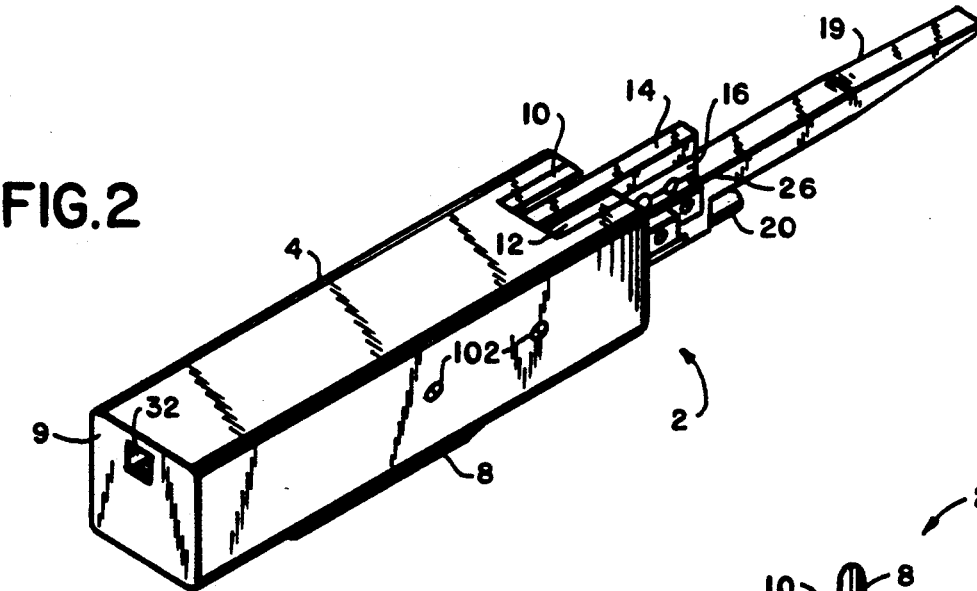
FIG. 2 is a perspective view of the tool of the present invention showing the bottom, rear, and the second side of the tool.

Referring to the accompanying drawing, which forms a part of this specification, an illustration of a tool according to the present invention is generally indicated at 2 and includes a handle body 4 having a central recess 6 within which is located a moveable handle 8 secured to a pivoted arm 14.

Secured to the handle body 4 within the central recess 6 are laterally spaced apart support plates 10 and 12 between which is located the pivoted arm 14 on pivot pin 13. The forward top surface 15 of the arm 14, carries a cutter-stripper blade 16 having an edge 62. A screwdriver base 18 is secured to and between the plates 10 and 12 and positioned above and opposedly with respect to the forward portion, forward top surface 15, of the pivoted arm 14. Extending forwardly from the screwdriver base 18 is a dowel 20 which is spaced laterally from the screwdriver shaft 19 which is also extending forwardly from the base 18. The dowel 20 is fitted into recess 76 in the base 18.

Provided within the rear 9 of the handle body 8 is a rectangular cross sectional recess 32, which serves as a wire twister. Wires 40 and 42 are inserted and twisted upon themselves to secure them to each other in a known manner.

Figure 7:
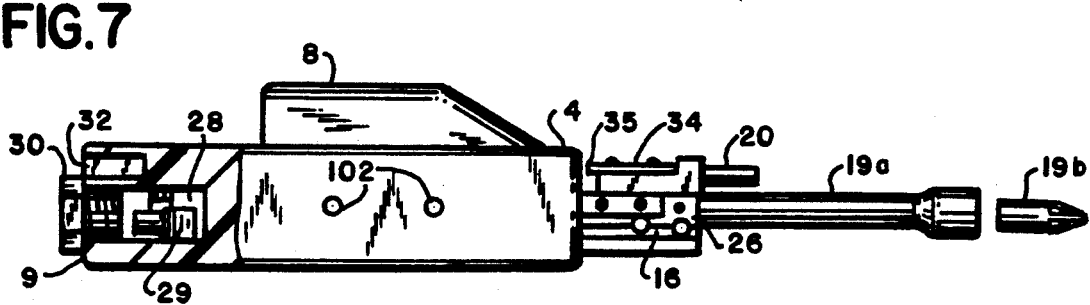
FIG. 7 is a further side view partially in section showing the use of alternate screwdriver tips.
Figure 8:
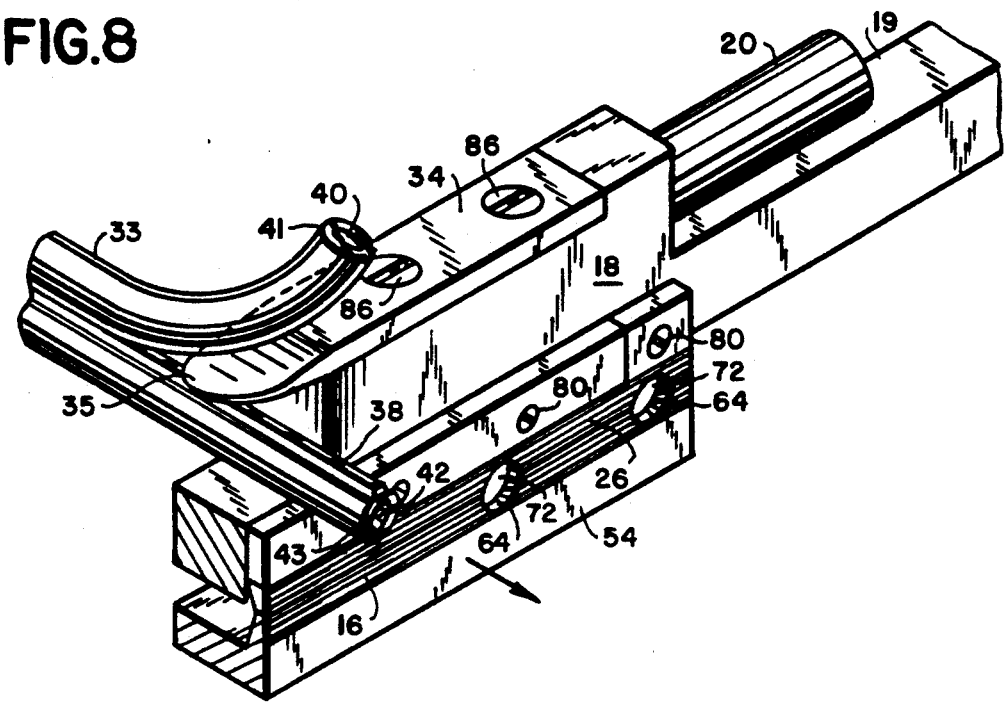
FIG. 8 is a perspective view partially in section of the sheath cutting blade portion of an embodiment of the tool.

Optionally the rear 9 of the handle body 8 may also include a storage compartment 28 as shown in FIG. 7 for alternative screwdriver blades 29 and 19b. A threaded cap or stopper 30 is provided to secure the alternate blade 29 in the compartment 28.

Figure 6:
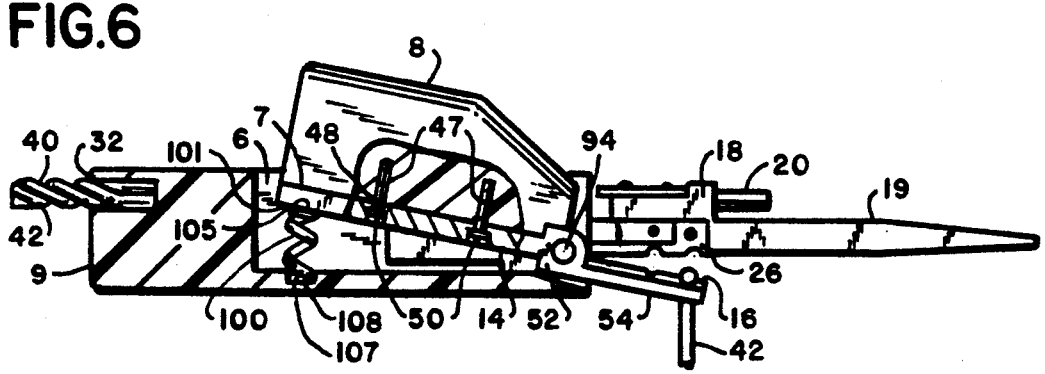
FIG. 6 is a similar view partially in section showing the arm in the open position with a wire to be cut and the spring in the expanded position.

The bottom 7 of the moveable handle 8 has threaded apertures 47 shown in FIG. 6 for receiving screws 50 which pass through apertures 48 in the pivot arm 14 to secure it to the bottom 7 of the moveable handle 8.

Extending forwardly of the heel 52 of the arm 14, is a forwardly extending arm section 54 to which base 56 of the blade 16 is secured by screws 60 which pass through apertures 58 in the arm extension 54 into threaded apertures, not shown, in the lower surface of the blade base 56. The edge 62 of the blade 16 has recesses 64 which cooperate with similar opposed recesses 72 in the blade 26 on the lower surface of the shaft base 18.

The corresponding upper blade 26 with cutting edge 76 and the recesses 72 is secured to the base 18 by threaded screw 80 passing through aperture 78 in the blade 26 to be secured in the threaded aperture 74 in the side of screwdriver base 18.

The top surface 82 of the base 18 has a pair of threaded apertures 84 for receiving threaded screws 86 which pass through apertures 88 in a slitting blade 34. The cutting edge 35 of the slitting blade 34 faces the forward face 36 of the handle body 4 and is slightly spaced therefrom for placing the insulated cable 33 there between for slitting.

The support arms 10 and 12 are provided with threaded apertures 106 for receiving screws 102 which pass through apertures 104 in the handle body 4 to secure the arms 10 and 12 to the handle body 4.

The plate 12 is provided at its forward end with an aperture 90 through which the pivot pin 13 passes, and then in turn through the aperture 92 in the heel of the arm 14. A threaded extension 94 of the pivot pin 13 is received in a threaded aperture 96 in the support plate 10. The head of the pin 13 is slotted as indicated at 98.

The arm 14 is biased to the open position by a compression spring 100 bearing at one end 101 on the lower surface 105 of the arm 14 and on the other end 107 on the floor base recessed ledge 108 of the recess 6 in the handle body 4.

The operation of the tool is readily apparent.

Figure 10:
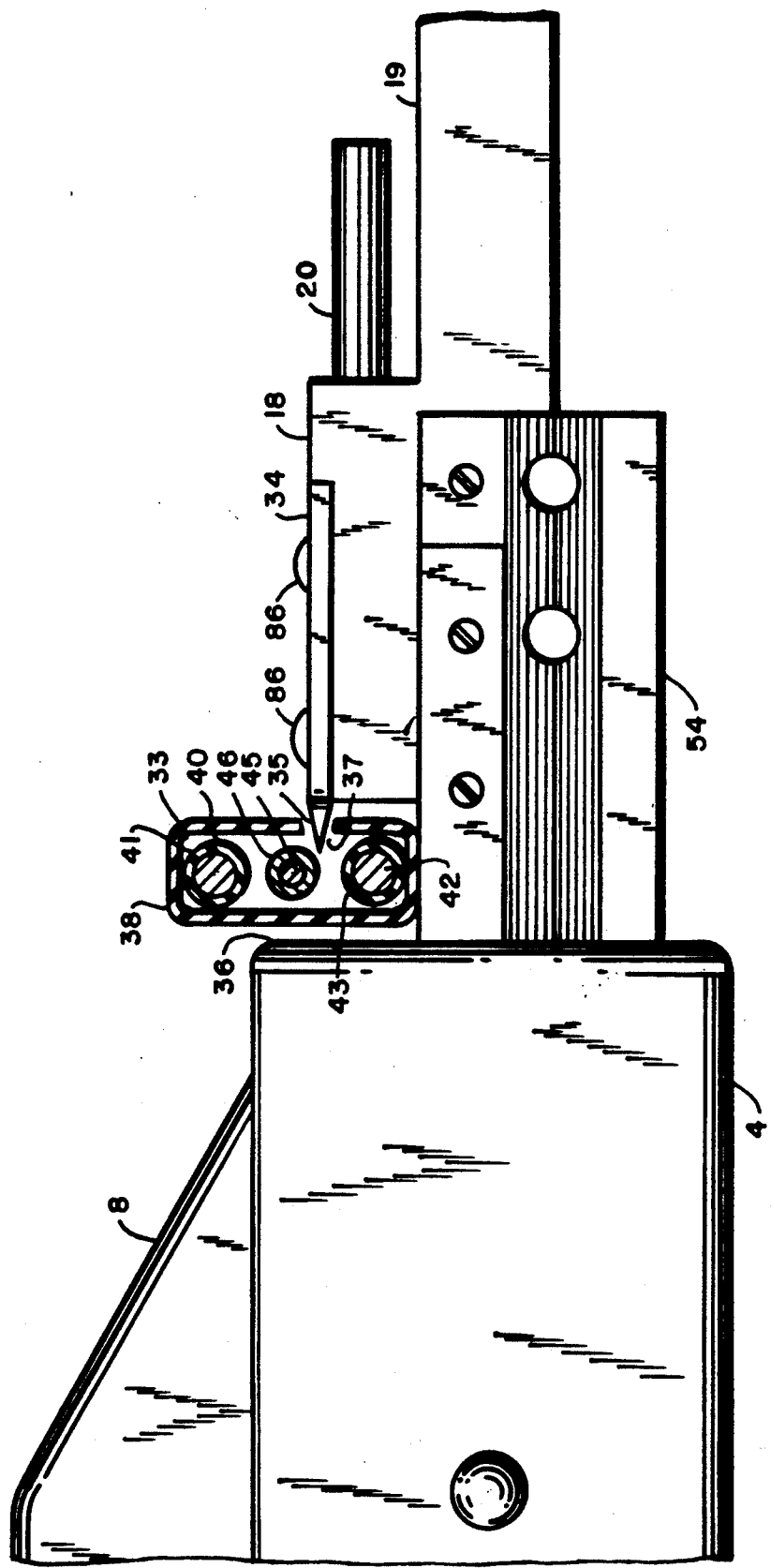
FIG. 10 is an enlarged partial side plan view of the tool being used to strip cable.

As best shown in FIG. 10, the insulated cable 33 is stripped by placing it in between the edge 35 of the slitting blade 34 and the forward face 36 of the handle body 4 and drawing the blade 34 along the sheath 38 of the cable 33 slitting the sheath 38 and forming the longitudinal slit 37. The sheath 38 is then cut with the cutting blades 26 and 16 and then the recesses 64 and 72 respectively in those blades utilized to strip insulation 41 and 43 respectively from the interior wires 40 and 42 of the cable 33. A ground 45 having a paper covering 46 is stripped by hand.

Figure 3:
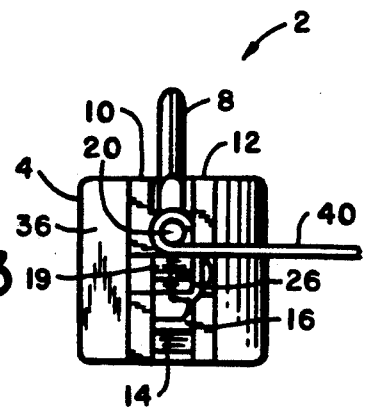
FIG. 3 is a front plan view of the tool.
Figure 4:
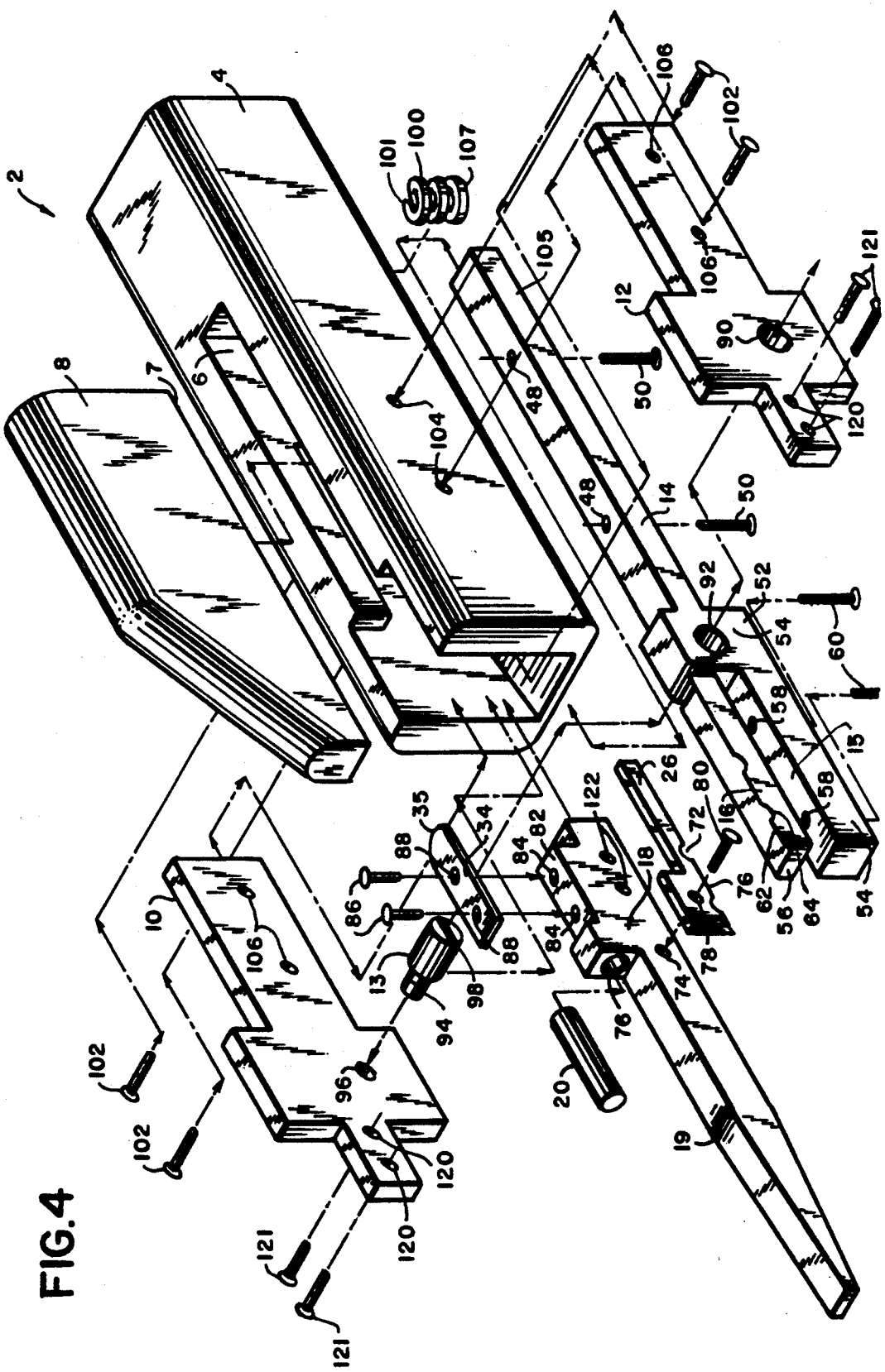
FIG. 4 is an expanded perspective view of the tool showing individual parts of the tool assembly.
Figure 5:
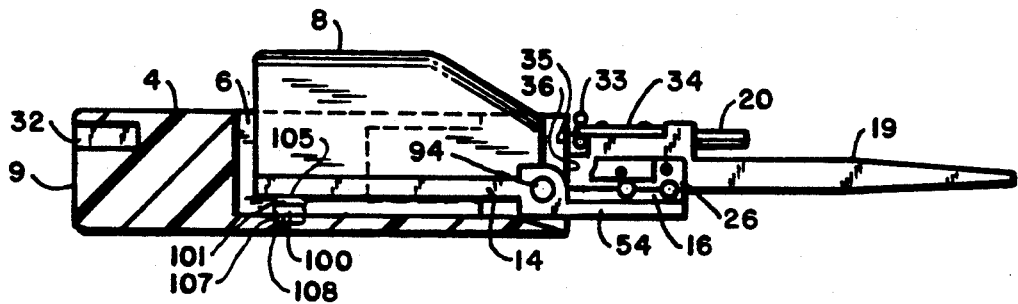
FIG. 5 is a side view partially in section of the tool with moveable arm in the closed condition and showing the position of the spring in the compressed condition.

As shown in FIG. 3 the ends of the wires 40 and/or 42 are formed into eyelets by placing the wires between the dowel 20 and shaft 19 and rotating he tool 2 about the longitudinal axis.

If desired, the ends of wires 40 and 42 may be inserted into the recess 32 in the rear 9 of the handle body 4 and the tool 2 rotated about its longitudinal axis to twist the wires about each other to secure them together.

Figure 9:
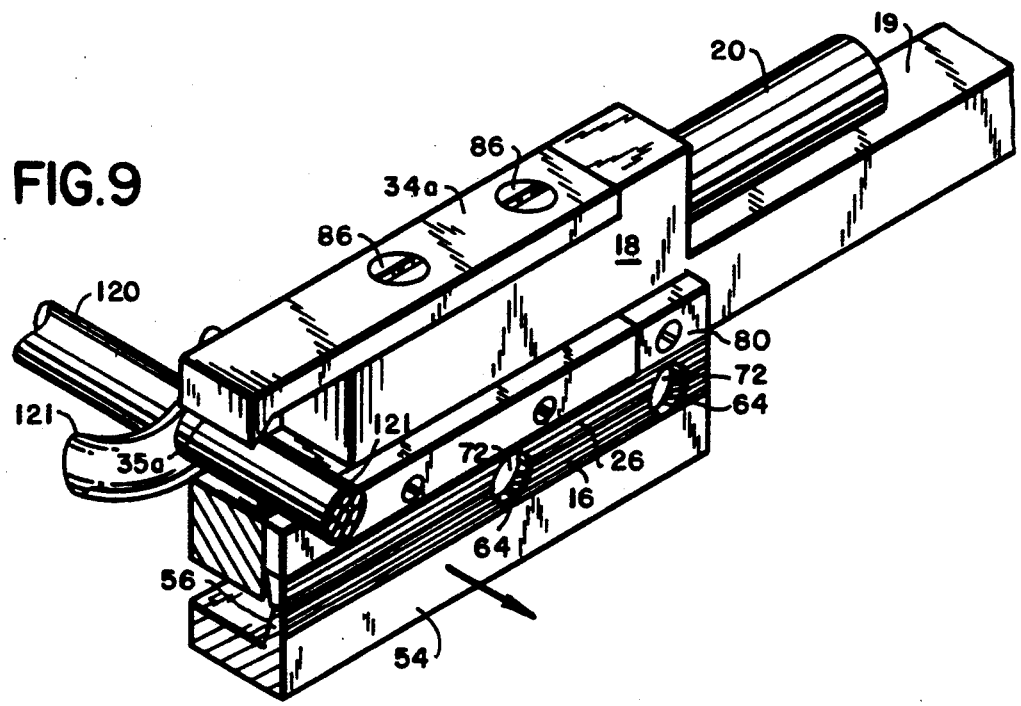
FIG. 9 is a side view partially in section of an alternative sheath cutting blade embodiment.

Referring to FIG. 9 a different slitting blade 34A, having a cutting edge 35A which extends downwardly towards but is spaced from the shaft 19, may be utilized for slitting the sheathing 121 from a round insulated multi-conductor wire 120.

Using this tool, one may accomplish all the necessary routine operations of wiring fixtures from preparing and sizing the wires and securing them to each other or to fixtures without using other tools or having to reorient the tool in the user's hand.

Although the invention has been described by reference to an illustrative embodiment, it is not intended that the novel device be limited thereby, but that modifications thereof are intended to be included as falling within the broad spirit and scope of the foregoing disclosure, the following claims and appended drawings.

What is claimed is:

1. A combination tool comprising a handle body, said handle body having a front and a rear, a central recess in said handle body, a screwdriver base, and a screwdriver shaft extending forwardly of said body, and having a screwdriver tip at its forward end, the lower surface of said screwdriver base having a downwardly extending cutting blade thereon, a pivotable arm mounted in the forward end of said handle body within said central recess, the forward end thereof extending forwardly of said handle body and having an upwardly extending blade on its forward section, said upwardly extending blade opposed to the blade on said screwdriver base, each of said blades having opposed recesses therein to serve as wire strippers, said pivot arm being biased away from said screwdriver base, a forwardly extending dowel laterally spaced from said screwdriver shaft in longitudinal alignment with said screwdriver shaft, and a sheath cutter blade mounted on said screwdriver base and extending towards the front of said handle body.

2. A combination tool comprising a handle body, said handle body having a front and a rear, a central recess in said handle body, a screwdriver base, and a screwdriver shaft extending forwardly of said handle body and having a screwdriver tip at its forward end, the lower surface of said screwdriver base having a downwardly extending cutting blade thereon, a pivotable arm mounted in the forward end of said handle body within said central recess, the forward end thereof extending forwardly of said handle body and having an upwardly extending blade on its forward section, said upwardly extending blade opposed to the blade on said screwdriver base, said pivot arm being biased away from said screwdriver base, and a forwardly extending dowel laterally spaced from said screwdriver shaft in longitudinal alignment with said screwdriver shaft.

3. A combination tool as claimed in claim 1 wherein said screwdriver tip is changeable.

4. A combination tool as claimed in claim 3 wherein said rear of said handle body has a recess therein for storing replaceable screwdriver tips.

5. A combination tool as claimed in claim 1 wherein said handle has a recess formed therein serving as a wire twister.

6. A combination tool as claimed in claim 5 wherein said screwdriver tip is changeable.

7. A combination tool as claimed in claim 6 wherein said handle has a recess formed in the rear thereof serving as a wire twister.

8. A combination tool as claimed in claim 2 wherein said screwdriver tip is changeable.

9. A combination tool as claimed in claim 8 wherein said rear of said handle body has a recess therein for storing replaceable screwdriver tips.

10. A combination tool comprising a handle body, said handle body having a front and a rear, a central recess in said handle body, a screwdriver base shaft extending forwardly of said handle body, and having a screwdriver tip at its forward end, the lower surface of said shaft having a downwardly extending cutting blade thereon, a pivotable arm mounted in the forward end of said handle body within said central recess and, the forward end thereof extending forwardly of said handle body and having an upwardly extending blade on its forward section, said upwardly extending blade opposed to the blade on said shaft base, each of said blades having opposed recesses therein to serve as wire strippers, said pivot arm biased away from said shaft base, a forwardly extending dowel laterally spaced from said shaft base in longitudinal alignment with said shaft base, and a sheath cutter blade mounted on said shaft base and extending rearwardly and curving downwardly towards but spaced from the surface of said shaft base.

11. A combination tool comprising a handle body, said handle body having a front and a rear, a central recess in said handle body, a base shaft extending forwardly of said handle body, the lower surface of said shaft having a downwardly extending cutting blade thereon, a pivotable arm mounted in the forward end of said handle body within said central recess, the forward end thereof extending forwardly of said handle body and having an upwardly extending blade on its forward section, said upwardly extending blade opposed to the blade on said shaft base, each of said blades having opposed recesses therein to serve as wire strippers, said pivot arm biased away from said shaft base, a forwardly extending dowel laterally spaced from said shaft base in longitudinal alignment with said shaft base, and a sheath cutter blade mounted on said shaft base and extending towards the front of said handle body, and said handle body having a recess in the rear thereof for storing replacement blades.

* * * * *